V. WISNIEWSKI.
FLYING MACHINE, AIRSHIP, AND THE LIKE.
APPLICATION FILED JUNE 18, 1908.
948,121.
Patented Feb. 1, 1910.
3 SHEETS—SHEET 1.
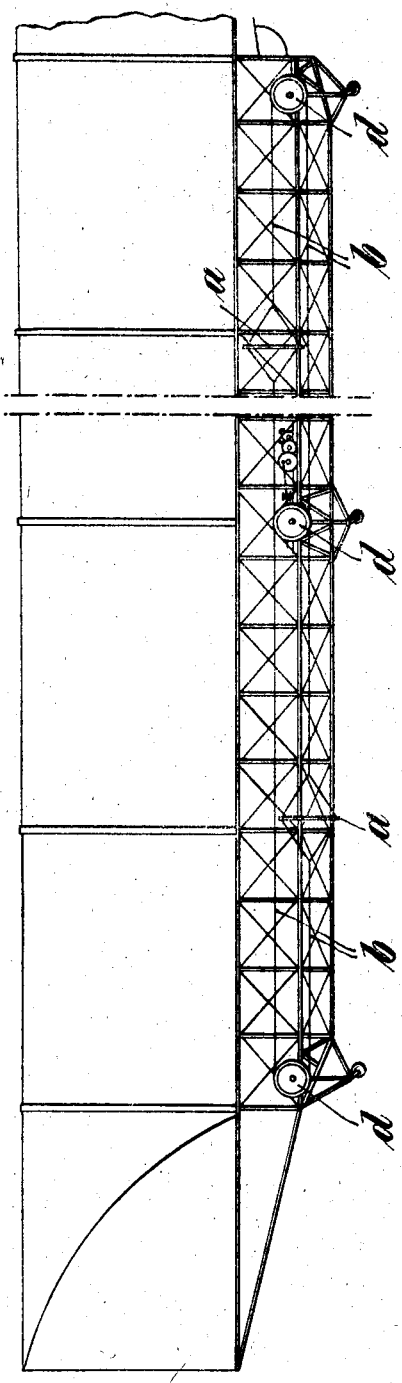

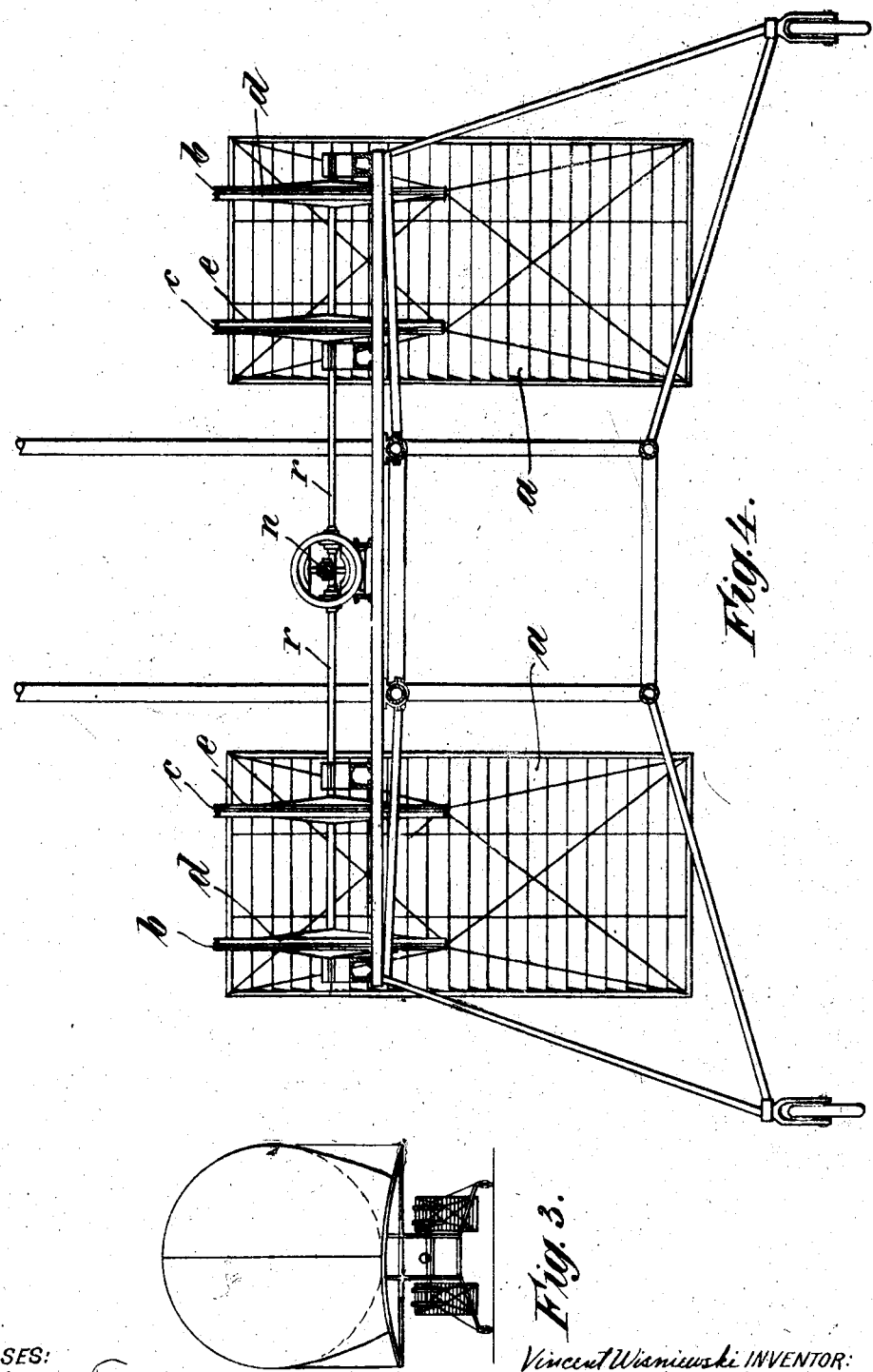

V. WISNIEWSKI.
FLYING MACHINE, AIRSHIP, AND THE LIKE.
APPLICATION FILED JUNE 18, 1908.

948,121.  Patented Feb. 1, 1910.

3 SHEETS—SHEET 3.

WITNESSES:
A. Faber du Faur
Sally O. Yudizky

Vincent Wisniewski INVENTOR
BY Frak P. Schutz
ATTORNEY.

UNITED STATES PATENT OFFICE.

VINCENT WISNIEWSKI, OF BERLIN, GERMANY.

FLYING-MACHINE, AIRSHIP, AND THE LIKE.

948,121.     Specification of Letters Patent.     Patented Feb. 1, 1910.

Application filed June 18, 1908. Serial No. 439,222.

*To all whom it may concern:*

Be it known that I, VINCENT WISNIEWSKI, architect, a subject of the German Emperor, and resident of Berlin, Germany, have invented new and useful Improvements in Flying-Machines, Airships, and the Like, of which the following is a specification.

This invention relates to flying machines, airships and the like, and has for its object to provide simple and efficient mechanism for effecting a horizontal drive.

In apparatus according to this invention the underlying fundamental idea is that propelling wings are moved with an almost constant speed over a horizontal path, which is of such length that the greatest mean velocities of an opposing wind will be considerably exceeded by the velocity of the said wings, whereby the wind is, as it were, overtaken. The resistance introduced by the velocity of the structure itself through the atmosphere must also be overcome. The stroke of such wings is therefore large, and the wings themselves are made as large as desired, their frontal resistance being in proportion to their size. The wings are so arranged that their entire surface acts horizontally against the air in one direction, to propel the ship against the resistance of atmosphere, which resistance is directly proportional to the square of the velocity of said ship; and, in case the ship moves against or with the wind, the velocity of the wings must be proportionally increased or decreased. The apparatus is preferably provided with a number of wings which are arranged to work in opposite directions coöperating to afford a continuous drive.

Figure 5:
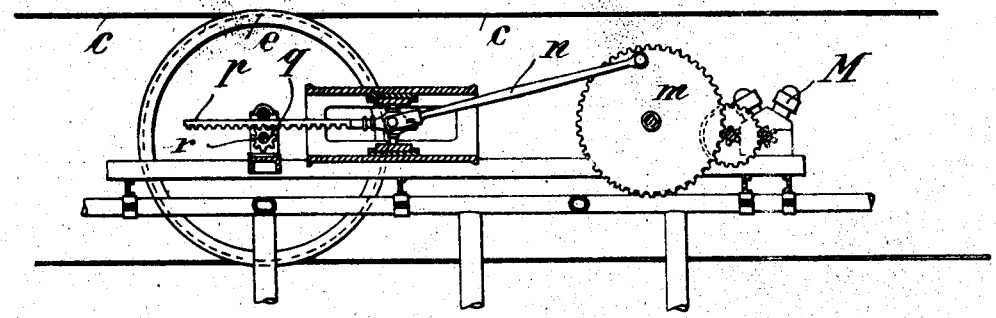
Figure 6:
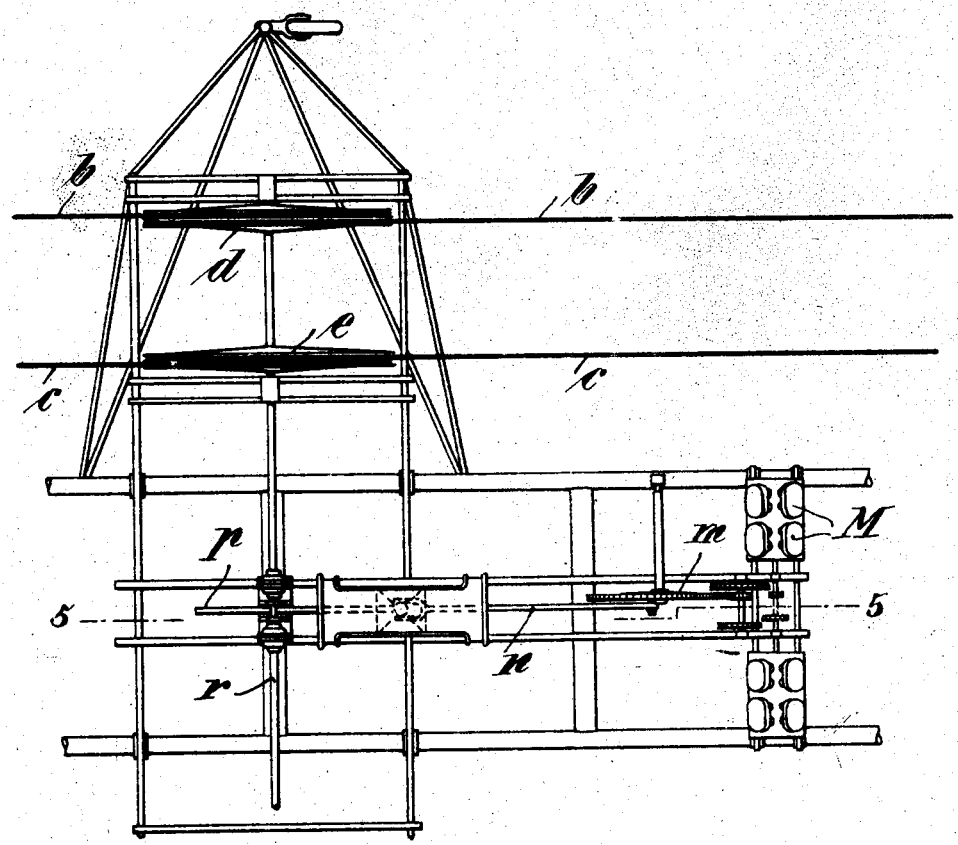

In the accompanying drawings which illustrate apparatus embodying my invention—Figure 1 illustrates in side elevation an airship fitted with driving mechanism embodying this invention. Fig. 2 is a plan thereof. Fig. 3 is an end view. Fig. 4 is an end view to a larger scale with certain parts omitted. Fig. 5 is a section on the line 5—5, Fig. 6. Fig. 6 is a partial plan showing the motor and driving mechanism.

Similar characters of reference designate corresponding parts throughout the several views.

Referring now to the drawings, it will be noted that this invention is shown applied to an airship or navigable baloon, but such mechanism is also suitable for application to other types of flying machines. The underside of the balloon is shown constructed as a plane surface. In the example shown, cables $b$ and $c$ are arranged to run parallel to each other in opposite directions, and drive and support wings $a$ adapted to open when moving in one direction, but which are closed when moving in the opposite direction. Thus for example cable $b$ runs over the wheels $d$ and cable $c$ over wheels $c$. The wheels $d$ and $e$ are moved intermittently in opposite directions, so that the cables $b$ and $c$ are caused to move alternately forward and backward. The wheels $d$ and $e$ are duplex, see Fig. 6, and are simultaneously employed to drive a second pair of wings $a$ in the opposite direction. The rotation of wheels $d$ and $e$ by reversing gears, is accomplished in any desired way from a suitable motor M.

In Figs. 5 and 6 I have illustrated one form of such operating mechanism. The motor M drives, through a train of gears, the wheel $m$ to which is attached a connecting rod $n$ driving a rack $p$ which engages a pinion $q$ on the operating shaft $r$. This shaft carries the wheels $d$ and $e$, and the reciprocating motion of rack $p$ is communicated to same through the pinion $q$ and shaft $r$. The wing frames are each secured to the upper length of one cable and the lower length of the other and can be of any desired shape. In some cases other parts thereof may be secured to the cables. In cases where the upper lengths of both cables are connected to the wings, the two lower lengths thereof would be arranged to coöperate in the opposite direction. In such a construction the wheels $d$ and $e$ must be arranged to rotate in the same direction. If only one set of wheels $d$ or $e$ be used, the lower or the upper length of the cable might act as a guide and the upper or lower as a driving means. The dirigibility of the airship is effected by any known and suitable horizontal and vertical steering appliances.

As hereinbefore suggested, the apparatus comprises two sets of wings; and the arrangement is such, that as one set is making an operative stroke, the other set is being moved backwardly to its starting position. The upper and lower lengths of cables, bands or other traction devices passed around driving wheels, are preferably taken alternately as guiding and attachment points for each wing; but, as will be understood, only the upper and lower length or even only one upper or lower length may be used for supporting and guiding the wings. It is also to be noted that the apparatus need not necessarily work with a second set of wings. The wings are like shutters with doors or valves opening in one way only, being so constructed that in their operative or forward stroke they offer a great resistance, but on the inoperative or rearward stroke only a small resistance.

Having now particularly described and ascertained the nature of the said invention and in what manner the same is to be performed, I declare that what I claim is:—

1. In an airship, flying machine or the like: propelling apparatus comprising a number of driving wheels of large diameter and located at a relatively great distance apart in the direction of the length of the airship; driving mechanism adapted to impart alternate rotation to the same; driving members driven by said driving wheels; and shutter-like wings reciprocated at a high velocity by said driving members throughout the whole distance between said driving wheels.

2. In an airship, flying machine or the like: propelling apparatus comprising a number of driving wheels of large diameter and located at a relatively great distance apart in the direction of the length of the airship; driving mechanism adapted to impart alternate rotation to the same; a number of cables or bands guided over and driven by said driving wheels; and shutter-like wings fastened to said cables or bands and adapted to be reciprocated at a high velocity by the same throughout the whole distance between said driving wheels.

3. In an airship, flying machine or the like: propelling apparatus comprising a number of driving wheels of large diameter and located at a relatively great distance apart in the direction of the length of the airship; driving mechanism adapted to impart alternate rotation to same; a number of parallel and adjacent cables or bands guided over and driven by said driving wheels; and shutter-like wings fastened to the said cables or bands and adapted to be reciprocated at a high velocity by the same throughout the whole distance between said driving wheels.

4. In an airship, flying machine or the like: propelling apparatus comprising a number of driving wheels of large diameter and located at a relatively great distance apart in the direction of the length of the airship; driving mechanism adapted to impart alternate rotation to the same; traveling cables or bands guided over and driven by said driving wheels; and shutter-like wings fastened to and driven at a high velocity by said cables or bands to move in fixed relation to each other in opposite directions throughout the whole distance between said driving wheels.

5. In an airship, flying machine or the like: propelling apparatus comprising a number of driving wheels of large diameter and located at a relatively great distance apart in the direction of the length of the airship; driving mechanism adapted to impart alternate rotation to the same; a number of parallel and adjacent cables or bands guided over and driven by said driving wheels; and shutter like wings driven at a high velocity throughout the whole distance between said driving wheels by the lengths of cables running in one direction and guided by the lengths of cables running in the opposite direction.

In testimony, that I claim the foregoing as my invention I have signed my name in presence of two witnesses, this first day of June 1908.

VINCENT WISNIEWSKI.

Witnesses:
HENRY HASPER,
WOLDEMAR HAUPT.